US008441570B2

(12) United States Patent
Tsuda

(10) Patent No.: US 8,441,570 B2
(45) Date of Patent: May 14, 2013

(54) IMAGE-PICKUP APPARATUS AND LENS APPARATUS

(75) Inventor: Yuji Tsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 11/228,329

(22) Filed: Sep. 19, 2005

(65) Prior Publication Data

US 2006/0066747 A1    Mar. 30, 2006

(30) Foreign Application Priority Data

Sep. 29, 2004 (JP) ................................ 2004-284780

(51) Int. Cl.
H04N 5/225 (2006.01)

(52) U.S. Cl.
USPC .................... 348/360; 348/362; 348/222.1

(58) Field of Classification Search .................. 348/360, 348/362
See application file for complete search history.

(56) References Cited

U.S. PATENT DOCUMENTS

| 3,997,905 | A | * | 12/1976 | Iwata et al. | 396/244 |
| 4,470,687 | A | * | 9/1984 | Saito et al. | 396/242 |
| 4,518,239 | A | * | 5/1985 | Tomori | 396/71 |
| 4,860,108 | A | * | 8/1989 | Saito et al. | 348/230.1 |
| 5,168,365 | A | | 12/1992 | Kawahara | 358/228 |
| 5,579,081 | A | * | 11/1996 | Ishiguro | 396/161 |
| 5,739,854 | A | * | 4/1998 | Nishikawa | 348/335 |
| 5,847,756 | A | * | 12/1998 | Iura et al. | 348/220.1 |
| 6,130,717 | A | * | 10/2000 | Arai et al. | 348/360 |
| 6,702,483 | B2 | * | 3/2004 | Tsuboi et al. | 396/449 |
| 6,819,360 | B1 | * | 11/2004 | Ide et al. | 348/340 |
| 6,867,932 | B2 | * | 3/2005 | Noguchi | 359/739 |
| 7,336,306 | B2 | * | 2/2008 | Oda | 348/272 |
| 2002/0126214 | A1 | * | 9/2002 | Kijima et al. | 348/296 |
| 2002/0197070 | A1 | * | 12/2002 | Suzuki | 396/150 |
| 2004/0125421 | A1 | * | 7/2004 | Sato | 358/513 |
| 2004/0212696 | A1 | * | 10/2004 | Tsugita et al. | 348/231.6 |
| 2004/0252225 | A1 | * | 12/2004 | Ojima et al. | 348/362 |
| 2005/0018253 | A1 | * | 1/2005 | Takeda | 358/474 |

FOREIGN PATENT DOCUMENTS

| JP | 3-252638 A | 11/1991 |
| JP | 11244232 A | * 9/1999 |
| JP | 2000-098475 A | 4/2000 |
| JP | 2000-356804 A | 12/2000 |
| JP | 2001-117137 A | 4/2001 |
| JP | 2001-211391 A | 8/2001 |
| JP | 2003-174584 A | 6/2003 |

OTHER PUBLICATIONS

Office Action dated Jul. 16, 2010, in counterpart Japanese Application No. 2004-284780.
Official Action dated Jan. 21, 2011, in counterpart Japanese Application No. 2004-284780.
Office Action dated Nov. 22, 2011, in Japanese Application No. 2004-284780.

* cited by examiner

*Primary Examiner* — Roberto Velez
*Assistant Examiner* — Cynthia Segura
(74) *Attorney, Agent, or Firm* — Fitzpatrick, Cella, Harper & Scinto

(57) ABSTRACT

An image pickup apparatus and a lens apparatus capable of photographing high-grade still images even where an interlace type image pickup element is used are to be provided. When an instruction to photograph a still image is entered, a camera microcomputer generates a timing to intercept light coming incident on a lens according to the aperture value of an iris, and transmits this timing to a lens microcomputer. The lens microcomputer supplies a control signal to an aperture control circuit according to the received timing, and a mechanical shutter is caused to operate as the aperture control circuit closes the iris at high speed.

15 Claims, 9 Drawing Sheets

IMAGE-PICKUP APPARATUS AND LENS APPARATUS

BACKGROUND OF THE INVENTION

1. Field of the Invention

The present invention relates to an image pickup apparatus and a lens apparatus capable of picking up still images.

2. Related Background Art

As a type of video camera intended to shoot moving pictures, there is proposed what is known as an interchangeable lens video camera (Japanese Patent Application Laid-Open No. H03-252638). Another related system can capture still images by using a mechanical shutter (Japanese Patent Application Laid-Open No. 2003-174584).

The functional configuration of this interchangeable lens video camera can be broadly divided into a camera body block and an interchangeable lens block. A camera microcomputer is built into the camera body block. On the other hand, the interchangeable lens block is equipped with a lens microcomputer. Between the camera microcomputer and the lens microcomputer, a format regarding communication is set in advance. Communication following this format takes place between the camera microcomputer and the lens microcomputer.

Where an image is shot with an interlace type CCD, the picked-up still images are field images.

Users of interchangeable lens video cameras, too, want to shoot not only fine moving images but also fine still images. This requirement has emerged in connection with the recent increases in the number of pixels used in CCDs and the capacity of memories, together with the advancement in image processing technology among other factors.

However, with a video camera having no mechanical shutter, the recently increased number of pixels has made it sometimes difficult to pick up still images. This is due to "differences in exposure time within a frame".

This is particularly true of video cameras using interlace type CCDs. The following can be said of video cameras using interlace type CCDs where one image consists of one frame. In such a video camera, even-number charges and odd-number charges of scanning lines constituting each frame are alternately read out to form video signals for one image. Therefore, where a still image thereby formed has an information quantity of only one field (either even-number or odd-number charge information), it is impossible to obtain a still image of an adequate grade. If the still image generated had an information quantity of one frame, a fine still image could be obtained, but an interlaced field contains only half of the information quantity a full frame should have. For instance, where there is an information quantity of only one field, if there is a diagonal stripe on the object, the edge of that diagonal stripe will appear zigzag in the photographed image.

SUMMARY OF THE INVENTION

The present inventor has made earnest studies in pursuit of an image pickup apparatus and a lens apparatus which can provide high-grade still images even without a mechanical shutter, and eventually arrived at the following aspects of the invention.

According to a first aspect of the invention, information regarding the brightness of the object on the basis of electric signals obtained by an image pickup element is supplied to a lens apparatus, an aperture value is acquired by an aperture unit; and, when an instruction to photograph a still image has been entered, a timing is generated according to the aperture value acquired by an aperture value obtaining unit to cause the aperture unit to intercept the light having come incident on the lens and transmitted to the lens apparatus.

According to another aspect of the invention, there is provided an image pickup unit which converts the optical image of an object having come incident via the lens apparatus into electric signals and, when an instruction to photograph a still image has been entered, a timing to cause the light shielding unit to intercept the light having come incident on the lens is generated and transmitted to the lens apparatus.

According to the invention, it is possible to intercept the light coming incident on the lens when picking up a still image. For this reason, even where an interlace type image pickup element is used, an information quantity of a full frame can be obtained, and accordingly a high-grade still image can be obtained.

Other objects or features of the present invention will become more apparent from the following description when taken in conjunction with the accompanying drawings.

DESCRIPTION OF THE PREFERRED EMBODIMENTS

Embodiments of the present invention will be described in specific terms below with reference to the accompanying drawings.

First Embodiment

Figure 1:
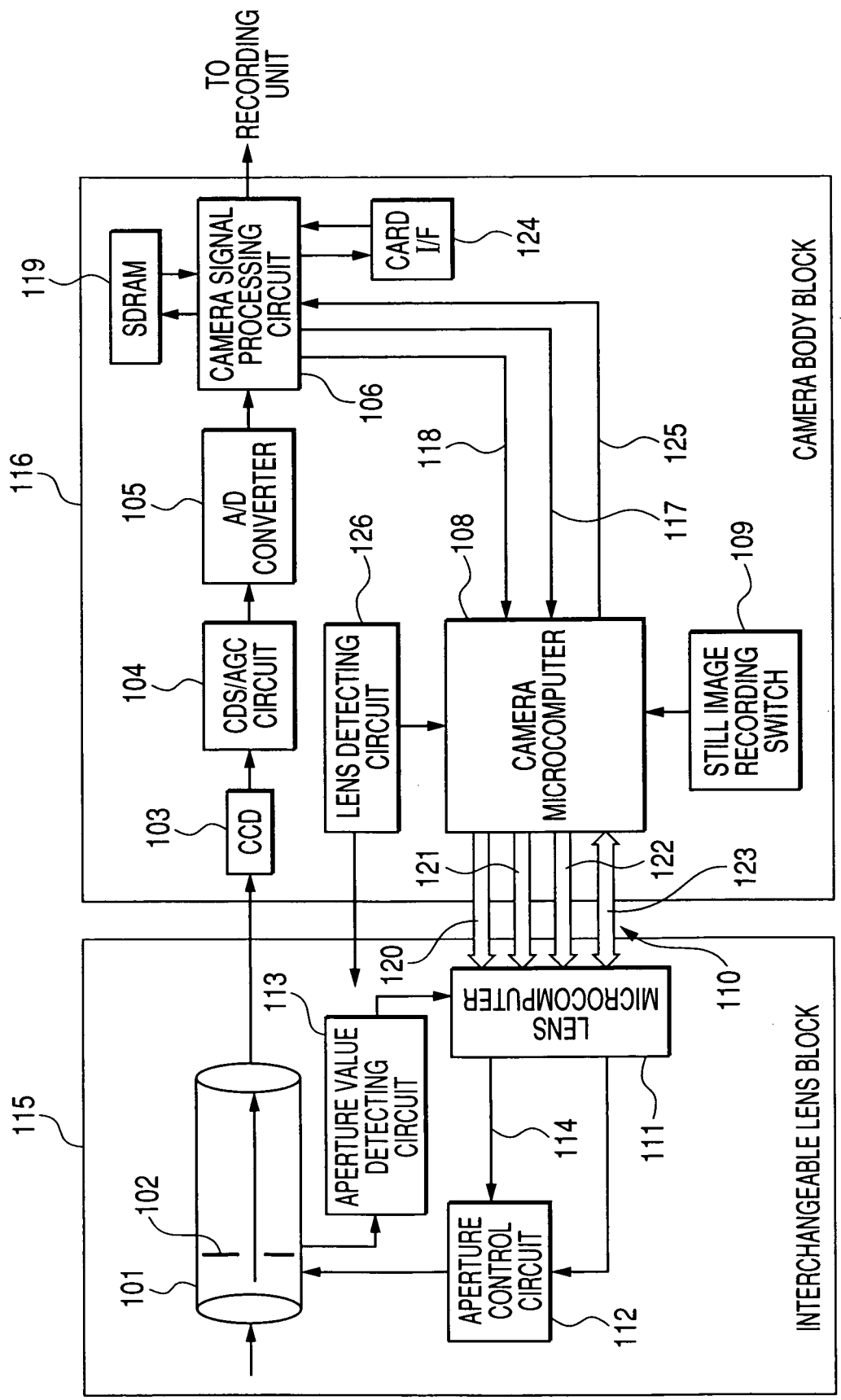
FIG. 1 is a block diagram of the configuration of an interchangeable lens video camera, which is a first embodiment of the present invention.

To begin with, the first embodiment of the invention will be described. FIG. 1 is a block diagram of the configuration of an interchangeable lens video camera, which is the first embodiment.

The first embodiment is provided with a camera body block 116, and a detachable interchangeable lens block 115 is fitted to this camera body block 116.

The interchangeable lens block 115 is provided with an imaging lens 101 and an iris 102 for adjusting the light intensity. Similarly, the interchangeable lens block 115 is equipped with an aperture control circuit 112 for controlling the iris 102 and an aperture value detecting circuit 113 for detecting the aperture value of the iris 102. The interchangeable lens block 115 is further provided with a lens microcomputer 111 for performing control within the interchangeable lens block 115. In this embodiment, a shutter control signal 114 is supplied from the lens microcomputer 111 to the aperture control circuit 112. This is intended to enable the iris 102 to operate at high speed when the iris 102 is to be used as a mechanical shutter.

On the other hand, the camera body block 116 is equipped with an image pickup element 103, which may be a CCD or the like, and a correlated double sampling/automatic gain control sampling circuit (CDS/AGC circuit) 104. Similarly, the camera body block 116 is provided with an A/D converter 105 for digitizing analog image signals and a camera signal processing circuit 106. Also, the camera body block 116 has an SDRAM 119 for temporarily storing image signals having undergone image signal processing by the camera signal processing circuit 106. Further, the camera body block 116 is equipped with a camera microcomputer 108 for performing control within the camera body block 116, a still image recording switch 109 to be manipulated by the user when a still image is to be recorded, and a card I/F 124 for recording generated still images onto a recording medium, such as a card. To add, integrated data of brightness information are supplied from the camera signal processing circuit 106 to the camera microcomputer 108 as an AE-detection signal 118, and a vertical synchronizing signal (VD) 117 is also supplied. On the other hand, a still image recording execution signal 125 is supplied from the camera microcomputer 108 to the camera signal processing circuit 106 when the still image recording switch 109 is manipulated.

A communication line 110 is laid between the camera body block 116 and the interchangeable lens block 115, and power supply 120, a chip select (CS) signal 121, a clock (CLK) signal 122 and data (DATA) 123 are transmitted over this communication line 110.

The camera body block 116 is also provided with a lens detecting circuit 126 for judging whether or not the interchangeable lens block 115 has been mounted and whether or not the interchangeable lens that has been mounted has a mechanical shutter mechanism, such as the iris 102 mentioned above. The camera microcomputer 108 judges via the lens detecting circuit 126 whether or not the lens has been mounted and whether or not the interchangeable lens that has been mounted has a mechanical shutter mechanism, such as the iris 102 mentioned above.

Figure 2:
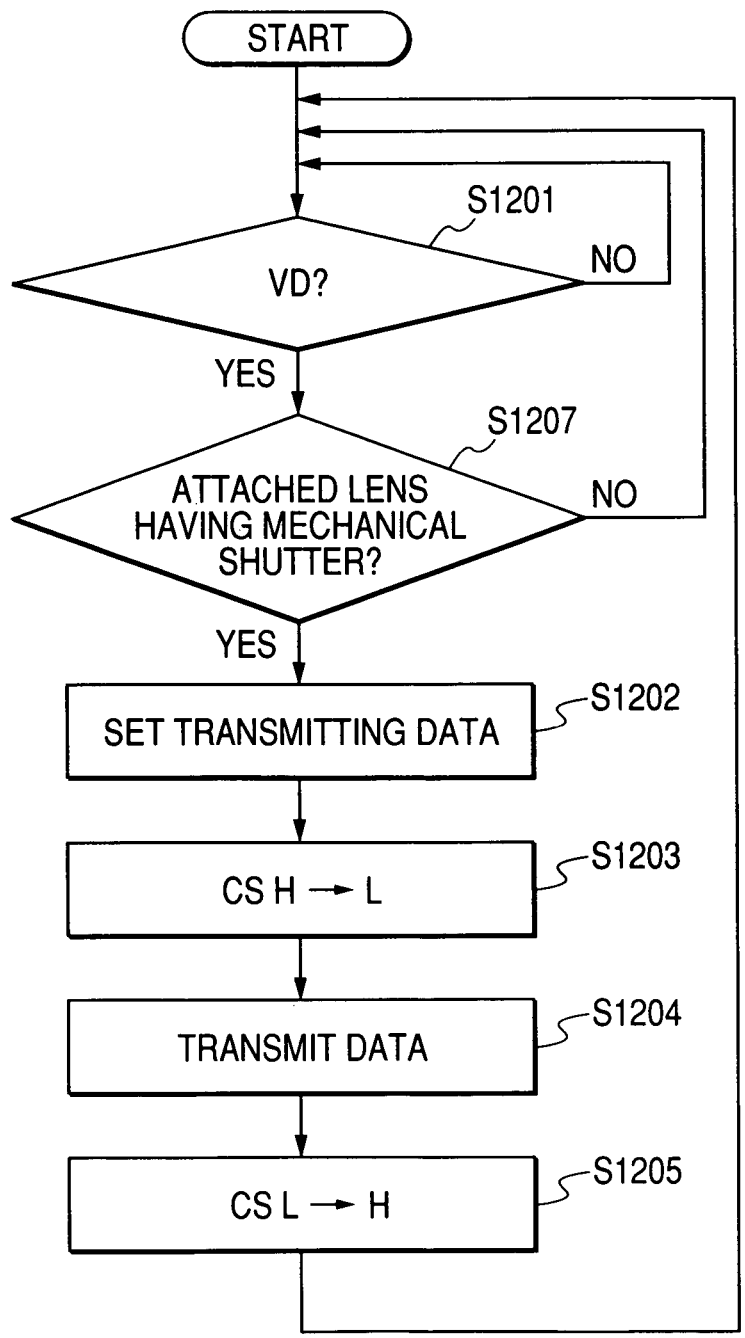
FIG. 2 is a flow chart showing the method of communication which takes place between a camera microcomputer 108 and a lens microcomputer 111.
Figure 3:
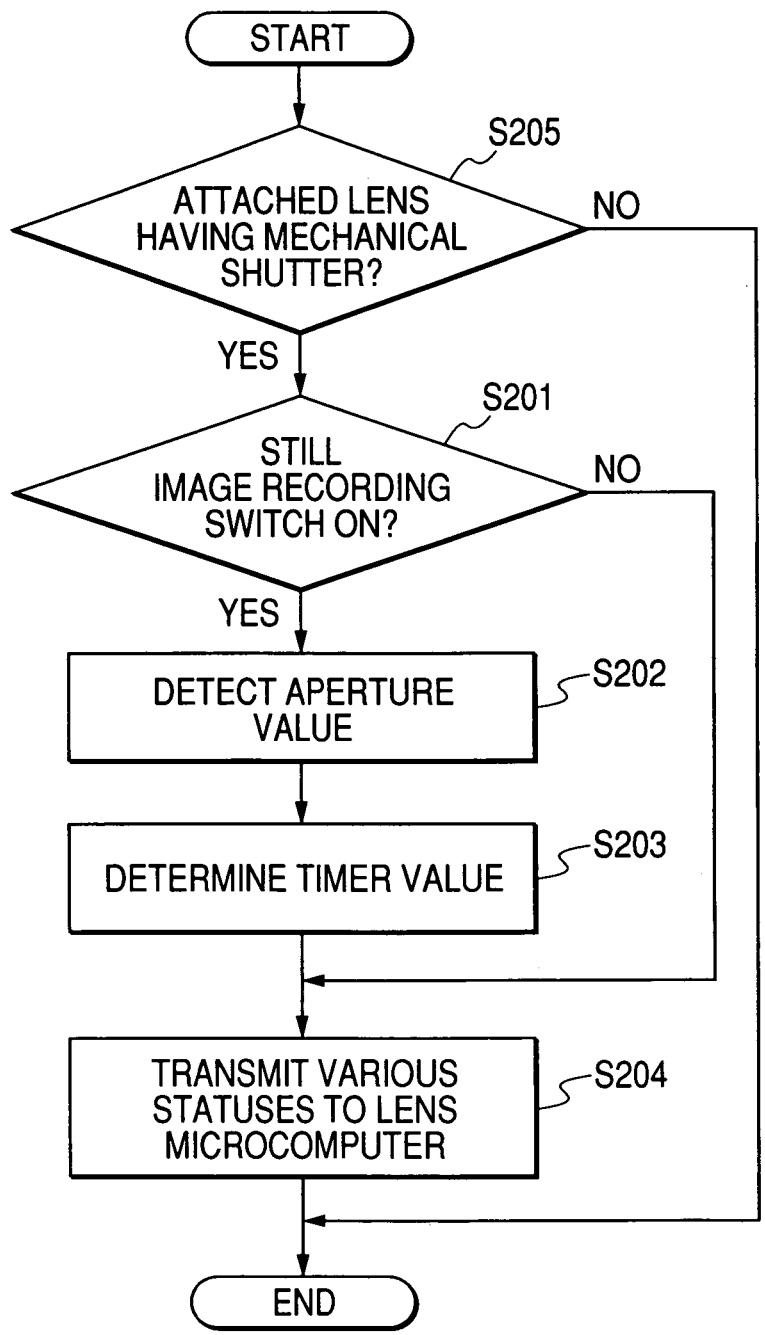
FIG. 3 is a flow chart showing the operation of the camera microcomputer 108 when a still image is to be picked up by the first embodiment.

Now will be described the operation of the first embodiment of the invention configured as described with reference to FIG. 2 through FIG. 5. FIG. 2 is a flow chart showing the method of communication which takes place between the camera microcomputer 108 and the lens microcomputer 111. FIG. 3 is a flow chart showing the operation of the camera microcomputer 108, when a still image is to be picked up by the first embodiment, and FIG. 4, a flow chart showing the operation of the lens microcomputer 111 when a still image is to be picked up by the first embodiment. FIG. 5 is a timing chart showing the operation of the interchangeable lens video camera, which is the first embodiment.

When the interchangeable lens block 115 is mounted on the camera body block 116, the camera microcomputer 108 judges via the lens detecting circuit 126 that the interchangeable lens has been mounted. When it is judged that the mounted interchangeable lens has a mechanical shutter mechanism such as the iris 102 mentioned above, power is supplied from the camera body block 116 to the interchangeable lens block 115 via the route of the power supply 120. An optical image from the object passes the lens 101, and forms an image on a CCD 103 whose light intensity is limited by the iris 102. The image signals having undergone photoelectric conversion by the CCD 103 are, after going though noise removal and gain control by the CDS/AGC circuit 104, digitized by the A/D converter 105 and delivered to the camera signal processing circuit 106. The camera signal processing circuit 106 processes the digital image signals into standardized image signals. When there is an instruction to record moving images, these image signals are delivered without being converted from the digital form into a recording unit (not shown), and recorded onto a recording medium, such as a tape or a recording disk.

The camera signal processing circuit 106, after integrating brightness information, supplies the integrated value to the camera microcomputer 108 as the detection signal 118 for automatic exposure control (A-E control). The camera microcomputer 108 transmits the AE-detection signal 118, into which the data 123 are included, to the lens microcomputer 111. Then, the lens microcomputer 111 supplies the aperture control circuit 112 with an aperture control signal to keep the value of the AE-detection signal 118 constant, and the iris 102 is controlled in accordance with an output signal from the aperture control circuit 112. In this way, aperture control is constantly accomplished.

Further, as shown in FIG. 2 and FIG. 5, when a vertical synchronizing (VD) signal supplied from the camera signal processing circuit 106 is entered, the camera microcomputer 108 judges via the lens detecting circuit 126 whether or not an interchangeable lens having a mechanical shutter mechanism such as the iris 102 described above has been mounted (step S1201 and S1207). If it is found that an interchangeable lens having a mechanical shutter mechanism such as the iris 102 described above has been mounted, data to be transmitted to the lens microcomputer 111 are set (step S1202). These transmit data include the AE-detection signal 118 mentioned above. Or if an interchangeable lens having a mechanical shutter function is not mounted, entry of another vertical synchronizing signal is awaited.

Next the polarity of the chip select (CS)-signal is varied from high (H) to low (L) (step S1203). The CS signal is supplied from the camera microcomputer 108 to the lens microcomputer 111 at a timing substantially synchronized with the falling phase of the VD signal. Then, the data 123 are transmitted to the lens microcomputer 111 (step S1204). After that, the polarity of the CS signal is returned from L to H (step S1205). In this way, every time a VD signal is generated, communication takes place between the camera microcomputer 108 and the lens microcomputer 111. To add, a clock (CLK) which is required when clock-synchronized communication is to be accomplished would also be transmitted from the camera microcomputer 108 to the lens microcomputer 111.

Next will be described the operation to photograph a still image. When the user is to photograph a still image, he or she turns on the still image recording switch 109 disposed on the camera body block 116.

As shown in FIG. 3, the camera microcomputer 108 judges via the lens detecting circuit 126 whether or not a lens has been mounted (step S205). If, for instance, an interchangeable lens having a mechanical shutter mechanism such as the iris 102 described above is mounted, the camera microcomputer 108 judges whether or not the still image recording switch 109 has been turned on (step S201) and, if the still image recording switch 109 is on, detects the aperture value of the iris 102 at the moment the still image recording switch 109 was manipulated (step S202). The aperture value of the iris 102 has been transmitted from the interchangeable lens block 115 as part of the data 123.

Next, the camera microcomputer 108 determines a timer value matching the detected aperture value (step S203). Here, the smaller the aperture value, the lower the timer value that is set. Thus, the darker the object and the closer the aperture to the fully open state, the lower the timer value. Incidentally, as will be described in more detail afterwards, the relative level of this timer value affects the timing of beginning to close the iris 102 which is caused to function as a shutter in this embodiment; the lower the timer value, the earlier the iris 102 begins to be closed.

Then, the camera microcomputer 108 transmits to the lens microcomputer 111 a status including the turning-on of the still image recording and the timer value determined at step S204 as part of the data 123, synchronized with the rising and falling edges of the CS signal 122 as shown in FIG. 5 (step S204). Incidentally, if the still image recording switch 109 has not been manipulated, a status indicating the fact is transmitted to the lens microcomputer 111 (step S204). If the shutter is turned on, that fact too is included in the status transmitted to the lens microcomputer 111.

Figure 4:
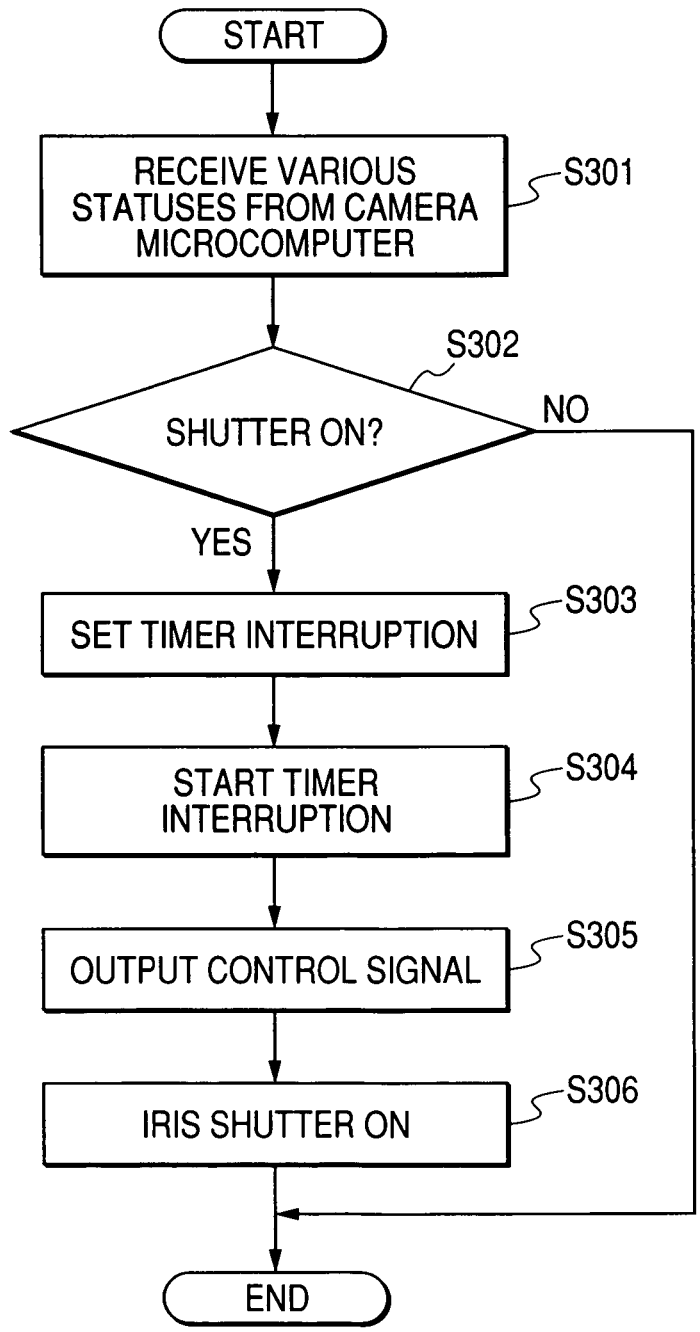
FIG. 4 is a flow chart showing the operation of the lens microcomputer 111 when a still image is to be picked up by the first embodiment.
Figure 5:
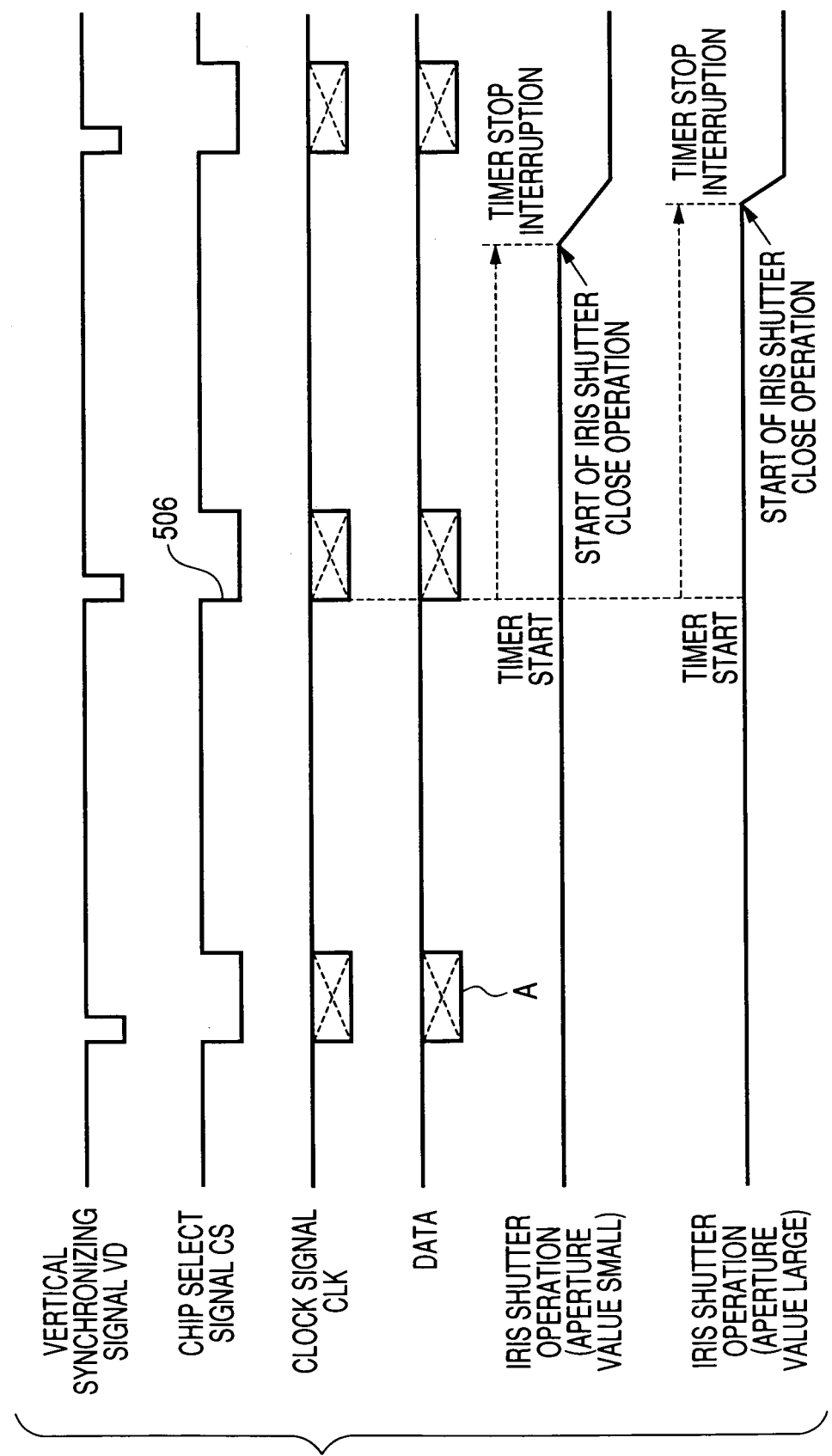
FIG. 5 is a timing chart showing the operation of the interchangeable lens video camera, which is the first embodiment.

The lens microcomputer 111, when it receives communicated data from the camera microcomputer 108 as charted in FIG. 4 (step S301), judges from the received status data whether or not the shutter has been turned on (step S302). If the data include information that the shutter has been turned on, it decodes the set timer value contained in the data received from the camera microcomputer 108, and sets timer interruption (step S303). Then it starts timer interruption at a prescribed timing (step S304). If, for instance, the data received at "A" in FIG. 5 include a status that the shutter has been turned on, it starts the timer on the basis of the timer value contained in the data received at "A" in synchronism with the fall timing 506 of the CS signal synchronized with the fall of the next VD signal.

After that, the lens microcomputer 111 performs timer stop interruption at the timing of the timer stop, and supplies a control signal 114 to place the iris 102 in a closed state to the aperture control circuit 112 (step S305). The aperture control circuit 112, when the control signal 114 is entered, causes the iris 102 to operate as a mechanical shutter by closing the iris 102 at high speed (step S306).

Incidentally, two types of iris shutter operation are listed in FIG. 5. The operation at a high aperture value (below) is later in timer stop interruption timing than the operation at a lower aperture value (above). This is because the object is relatively bright, accordingly the aperture value is high (below), the time taken by the iris 102, which functions as a shutter in this embodiment, to actually reach the closing end is short from the beginning of its closing, and therefore the camera microcomputer 108 sets the timer value high as stated above.

When the user is to photograph a still image, he or she turns on the still image recording switch 109 as stated above. Upon detecting this manipulation, the camera microcomputer 108 supplies the still image recording execution signal 125 to the camera signal processing circuit 106. Then, after the shutter button is pressed and the mechanical shutter operation by the iris 102 is performed, the camera signal processing circuit 106 generates a still image, and stores the still image data in the SDRAM 119. The still image data stored in the SDRAM 119 are recorded onto a card (not shown) via the card I/F 124.

This first embodiment of the invention enables a video camera having no mechanical shutter to record a still image formed in a fine frame by keeping the mechanical shutter of the interchangeable lens under appropriate communication control. Especially even where an interlace type CCD is used as the CCD 103, no light falls on the CCD 103 while signals are read out of the CCD 103 because the iris 102 performs mechanical shutter operation. Therefore, even though an interlace type CCD is used, an information quantity of a full frame can be obtained. As a result, a still image formed of a fine frame can be recorded.

Furthermore, as the timer value is appropriately adjusted according to the aperture value of the iris 102, and therefore the light can be appropriately controlled. Depending on the relative brightness of the object, there is a difference in the length of time taken by the iris 102 to reach its closing end when the iris 102 is caused to operate as a mechanical shutter. Thus, if the object is dark, the aperture is near its open position in a state of stable exposure, and therefore the time taken by the iris 102 to reach its closing end becomes relatively long. Conversely, if the object is bright, the aperture is near its fully closed position in a state of stable exposure, and therefore the time taken by the iris 102 to reach its closing end becomes relatively short. In this way, the time taken by the iris 102 to actually reach its closing end from the start of mechanical shutter operation by the iris 102 varies with the relative brightness of the object during the image pickup. To address this problem of difference in the time taken, the camera microcomputer 108 detects the aperture value when the still image recording switch 109 is turned on and performs appropriate light control in this embodiment, enabling the timer to be set according to the aperture value.

Second Embodiment

Figure 6:
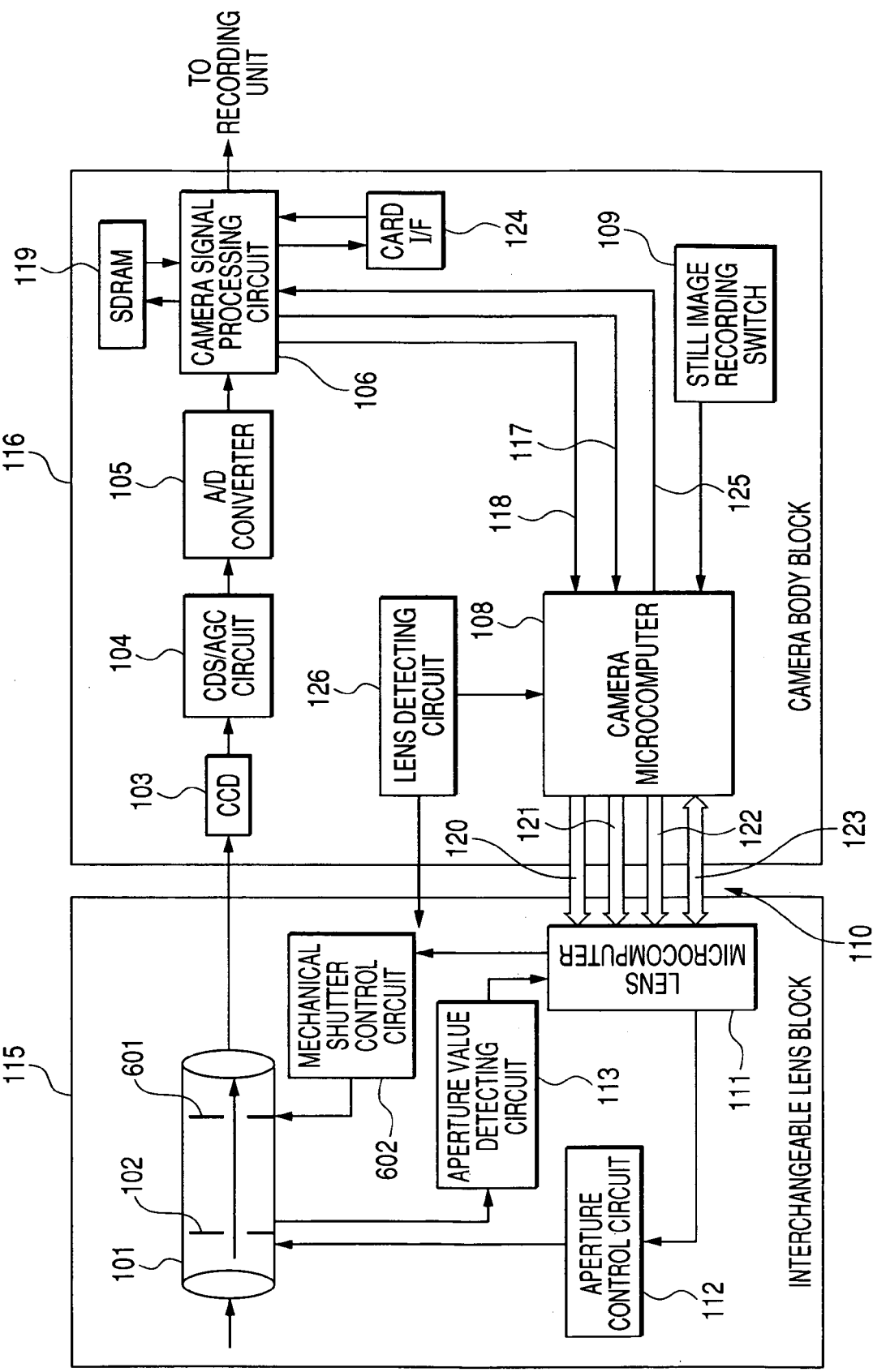
FIG. 6 is a block diagram of the configuration of an interchangeable lens video camera, which is a second embodiment of the invention.

Next, the second embodiment of the invention will be described. FIG. 6 is a block diagram of the configuration of an interchangeable lens video camera, which is the second embodiment.

As shown in FIG. 6, a mechanical shutter 601 to intercept incident light intensity to a CCD 113 and forbid exposure is disposed at a stage subsequent to the iris 102 in this second embodiment, and a mechanical shutter control circuit 602 to control the operation of the mechanical shutter 601 is provided within the interchangeable lens block 115. Unlike in the first embodiment, no control signal to cause the iris 102 to operate as a mechanical shutter is supplied from the lens microcomputer 111 to the aperture control circuit 112.

Figure 7:
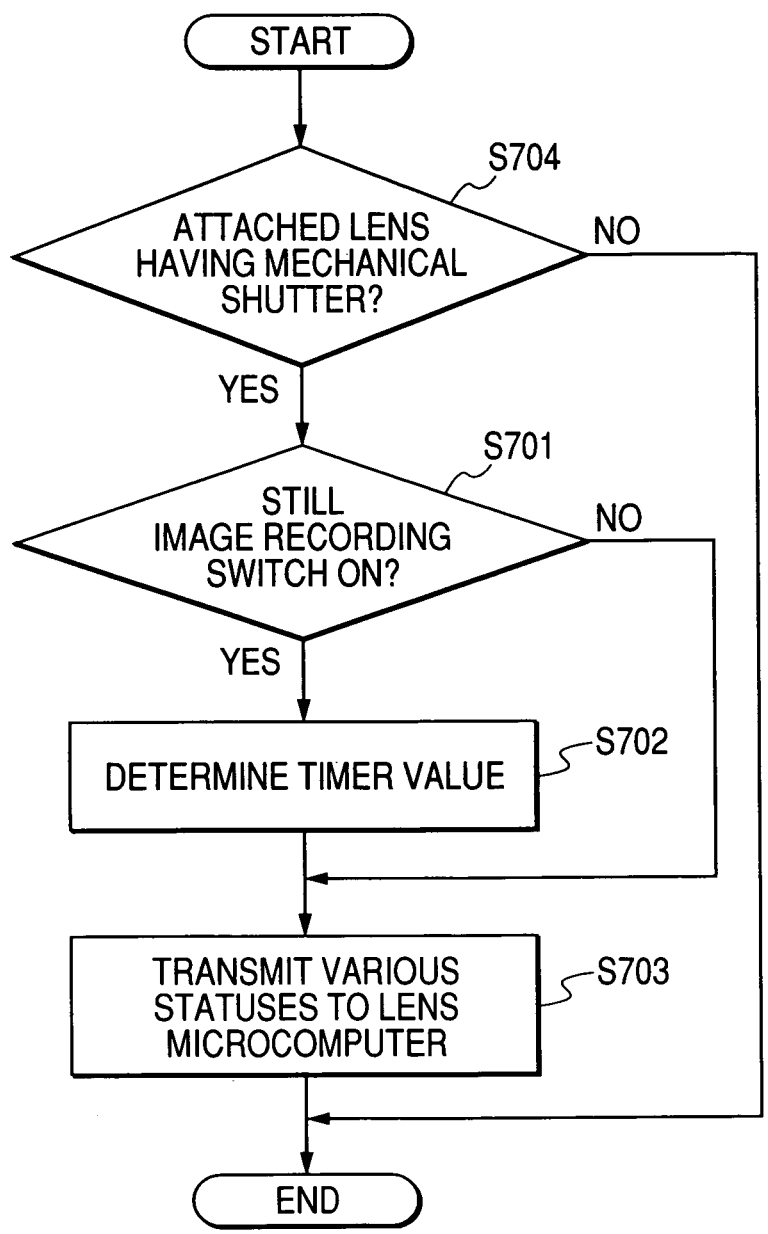
FIG. 7 is a flow chart showing the operation of the camera microcomputer 108 when a still image is to be picked up by the second embodiment.
Figure 8:
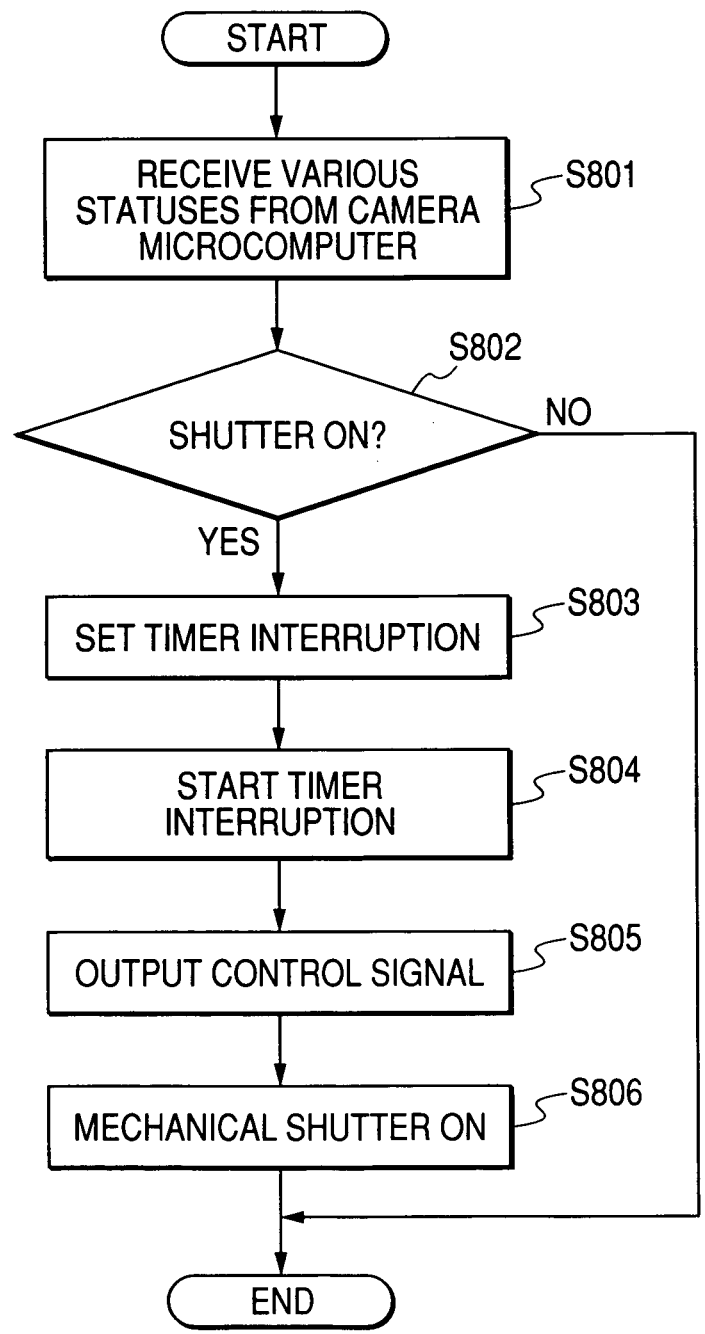
FIG. 8 is a flow chart showing the operation of the lens microcomputer 111 when a still image is to be picked up by the second embodiment.

Next will be described the operation of the second embodiment of the invention configured as stated with reference to FIG. 7 through FIG. 9. FIG. 7 is a flow chart showing the operation of the camera microcomputer 108 when a still image is to be picked up by the second embodiment; FIG. 8, a flow chart showing the operation of the lens microcomputer 111 when a still image is to be picked up by the second embodiment; and FIG. 9, a timing chart showing the operation of the interchangeable lens video camera, which is the second embodiment.

The operation, control of the aperture and communication between the camera microcomputer 108 and the lens microcomputer 111 when the interchangeable lens block 115 is mounted on the camera body block 116 are accomplished in the same way as in the first embodiment.

When a still image is to be photographed, as charted in FIG. 7, the camera microcomputer 108 judges via the lens detecting circuit 126 whether or not an interchangeable lens having a mechanical shutter mechanism such as the iris 102 described above has been mounted (step S704). If an interchangeable lens having a mechanical shutter mechanism such as the iris 102 described above is found mounted, the camera microcomputer 108 judges whether or not the still image recording switch 109 has been turned on (step S701) and, if the still image recording switch 109 is found turned on, it determines the timer value without detecting an aperture value (step S702). Incidentally, the timer value is a preset fixed value.

Figure 9:
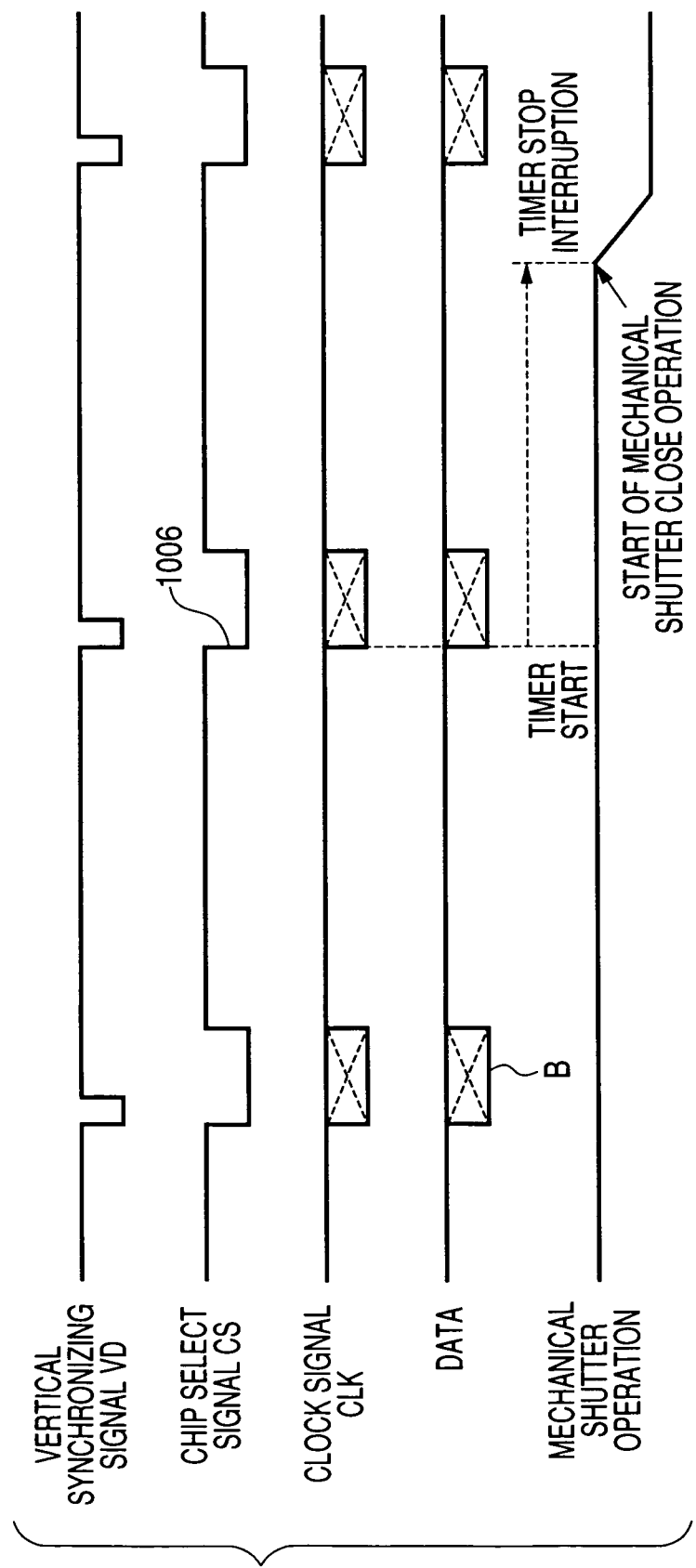
FIG. 9 is a timing chart showing the operation of the interchangeable lens video camera, which is the second embodiment.

Next, the camera microcomputer 108 transmits to the lens microcomputer 111 a status including the turning-on of a still image record and the timer value determined at step S702 as the data 123, synchronized with the rise and fall of the CS signal 122 as shown in FIG. 9 (step S703). Incidentally, when the still image recording switch 109 is not manipulated, a status indicating that fact is transmitted to the lens microcomputer 111 (step S703). When the shutter is turned on, that fact too is included in the status to be transmitted to the lens microcomputer 111.

The lens microcomputer 111, when it receives communicated data from the camera microcomputer 108 as charted in FIG. 8 (step S801), judges from the received status data whether or not the shutter has been turned on (step S802). If data indicating the turning-on of the shutter are contained, the lens microcomputer 111 decodes the set timer value contained in the data received from the camera microcomputer 108, and sets timer interruption (step S803). Then it starts timer interruption at a prescribed timing (step S804). If, for instance the data received at "B" in FIG. 9 include a status that the shutter has been turned on, it starts the timer on the basis of the timer value contained in the data received at "B" in synchronism with the fall timing 1006 of the CS signal synchronized with the fall of the next VD signal.

After that, the lens microcomputer 111 performs timer stop interruption at the timing of the timer stop, and supplies a control signal to place the mechanical shutter 601 in a closed state at high speed to the mechanical shutter control circuit 602 (step S805). The mechanical shutter control circuit 602, when that control signal is entered, causes the mechanical shutter 601 to operate as a mechanical shutter by closing it at high speed (step S806).

When the user is to photograph a still image, he or she turns on the still image recording switch 109 as stated above. Upon detecting this manipulation, the camera microcomputer 108 supplies the still image recording execution signal 125 to the camera signal processing circuit 106. Then, after the shutter button is pressed and the operation by the mechanical shutter 601 is performed, the camera signal processing circuit 106 generates a still image, and stores the still image data in the SDRAM 119. The still image data stored in the SDRAM 119 are recorded onto a card (not shown) via the card I/F 124.

This second embodiment of the invention, too, enables a video camera having no mechanical shutter to record a still image formed in a fine frame by keeping the mechanical shutter of interchangeable lens under appropriate communication control. Especially even where an interlace type CCD is used as the CCD 103, no light falls on the CCD 103 while signals are read out of the CCD 103 because the mechanical shutter 601 performs shutter operation. Therefore, as in the first embodiment, even though an interlace type CCD is used, an information quantity of a full frame can be obtained. As a result, a still image formed of a fine frame can be recorded.

To add, any embodiment of the invention can be realized by having a computer execute a program, for instance. Means of supplying the program to a computer, for instance a computer-readable recording medium having such a program record thereon, such as a CD-ROM or the like, or a transmission medium for transmitting this program, such as the Internet, can also be applied as an embodiment of the invention. The program itself can as well be applied as an embodiment of the invention. The program, recording media, transmission media and program products also fall under the scope of the present invention.

This application claims priority from Japanese Patent Application No. 2004-284780 filed on Sep. 29, 2004, which is hereby incorporated by reference herein.

What is claimed is:

1. An image pickup apparatus on which a lens apparatus can be detachably mounted, wherein the lens apparatus is provided with an aperture unit including a mechanical shutter mechanism that controls the intensity of light that passes through the lens apparatus, said image pickup apparatus comprising:
    an image pickup element which converts an optical image of an object incident thereon via the lens apparatus into electrical signals, synchronized with one of vertical synchronizing signals;
    a brightness information output unit which supplies the lens apparatus with brightness information on the basis of the electrical signals obtained by said image pickup element, synchronized with one of the vertical synchronizing signals;
    an aperture value obtaining unit which obtains an aperture value provided by the aperture unit, synchronized with one of the vertical synchronizing signals; and
    a control unit that generates, after an instruction to photograph a still image has been entered and before said image pickup element outputs the electrical signals, aperture control data that varies according to the aperture value obtained by said aperture value obtaining unit to control the aperture unit and transmits the aperture control data to the lens apparatus, synchronized with one of the vertical synchronizing signals,
    wherein the aperture unit (1) receives the aperture control data transmitted by said control unit synchronized with a first signal of the vertical synchronizing signals, (2) awaits entering of a second signal of the vertical synchronization signals, (3) awaits elapse of a time corresponding to the aperture control data from the entering of the second signal of the vertical synchronizing signals, and (4) in response to the elapse of time, controls the mechanical shutter mechanism to start intercepting the light incident on a lens to photograph the still image, and
    wherein the second signal is output from the image pickup apparatus to the lens apparatus after receiving the first signal.

2. An image pickup apparatus on which a lens apparatus can be detachably mounted, wherein the lens apparatus is provided with (i) a light shielding unit including a mechanical shutter mechanism to intercept light incident on a lens and (ii) an aperture unit for controlling the intensity of light passing through the lens, said image pickup apparatus comprising:
    an image pickup unit which converts the optical image of an object incident via the lens apparatus into electrical signals, synchronized with one of vertical synchronizing signals; and
    a control unit which, when an instruction to photograph a still image has been entered and while the aperture unit controls the intensity of light passing through the lens, (i) generates a light blocking timing signal, according to the controlling of the aperture unit, to cause the light shielding unit having the mechanical shutter mechanism to fully intercept the light incident on the lens, (ii) transmits the light blocking timing signal to the lens apparatus, synchronized with one of the vertical synchronizing signals, wherein the lens apparatus receives the light blocking timing signal transmitted synchronized with a first signal of the vertical synchronizing signals, and (iii) in response to (1) entering of a second signal of the vertical synchronizing signals and (2) elapse of a time which corresponds to the light blocking timing signal synchronized with the first signal of the vertical synchronizing signals and which is counted from the entering of the second signal of the vertical synchronizing signals, causes the light shielding unit having the mechanical shutter mechanism to start intercepting the light incident on the lens to photograph the still image, wherein the second signal is output from the image pickup apparatus to the lens apparatus after receiving the first signal.

3. The image pickup apparatus according to claim 2, further comprising:
a brightness information output unit which supplies the lens apparatus with brightness information on the basis of the electrical signals obtained by said image pickup unit.

4. The image pickup apparatus according to claim 2, further comprising:
a moving image recording unit which records onto a recording medium as moving image data the electrical signals obtained by said image pickup unit.

5. A lens apparatus capable of being detachably mounted on an image pickup apparatus, the lens apparatus comprising:
a lens;
an aperture unit, which has a mechanical shutter mechanism, that controls the intensity of light that passes through said lens with an aperture; and
an aperture control unit which controls said aperture unit on the basis of brightness information entered from the image pickup apparatus;
wherein said aperture control unit receives aperture control data, synchronized with a first signal of vertical synchronizing signals, to control the intensity of light passing through the lens and, when an instruction to photograph a still image has been entered and while the aperture unit having the mechanical shutter mechanism is controlling the intensity of light passing through the lens, causes said aperture unit having the mechanical shutter mechanism to start intercepting the light incident on said lens,
wherein said aperture control unit, having awaited entering of a second signal of the vertical synchronizing signals, causes, in response to elapse of a variable time which corresponds to the received aperture control data synchronized with the first signal of the vertical synchronizing signals and which is counted from the entering of the second signal of the vertical synchronizing signals, said aperture unit having the mechanical shutter mechanism to start intercepting the light incident on said lens to photograph the still image, and
wherein the second signal is output from the image pickup apparatus to the lens apparatus after receiving the first signal.

6. A lens apparatus capable of being detachably mounted on an image pickup apparatus, the lens apparatus comprising:
a lens;
a light shielding unit, which has a mechanical shutter mechanism, that intercepts the light incident on said lens;
an aperture unit for controlling the intensity of light passing through said lens with an aperture; and
a light shielding control unit which, when an instruction to photograph a still image has been entered into the image pickup apparatus and while said aperture unit controls the intensity of light passing through the lens, causes said light shielding unit having the mechanical shutter mechanism to start intercepting the light incident on said lens, wherein said light shielding control unit, having received a light blocking timing signal transmitted synchronized with a first signal of vertical synchronizing signals from the image pickup apparatus, and having awaited entering of a second signal of the vertical synchronizing signals, causes, in response to elapse of a time which corresponds to the light blocking timing signal transmitted synchronized with the first signal of the vertical synchronizing signals from the image pickup apparatus and which is counted from the entering of the second signal of the vertical synchronizing signals, said light shielding unit having the mechanical shutter mechanism to start intercepting the light incident on said lens to photograph the still image, and wherein the second signal is output from the image pickup apparatus to the lens apparatus after receiving the first signal.

7. The lens apparatus according to claim 6, further comprising an aperture control unit which controls said aperture unit on the basis of brightness information entered from the image pickup apparatus.

8. The lens apparatus according to claim 6, further comprising:
an aperture detecting unit which detects the aperture value in said aperture unit and supplies the value to the image pickup apparatus.

9. An image pickup system comprising:
an image pickup apparatus; and
a lens apparatus to be detachably mounted on said image pickup apparatus,
wherein said image pickup apparatus comprises:
(a) an image pickup element which converts an optical image of an object incident via said lens apparatus into electrical signals, synchronized with one of vertical synchronizing signals;
(b) a brightness information output unit which supplies said lens apparatus with brightness information on the basis of the electrical signals obtained by said image pickup element, synchronized with one of the vertical synchronizing signals;
(c) an aperture value obtaining unit which obtains the aperture value provided by an aperture unit, synchronized with one of the vertical synchronizing signals; and
(d) a control unit that generates, after an instruction to photograph a still image has been entered and before said image pickup element outputs the electrical signals, aperture control data that varies according to the aperture value obtained by said aperture value obtaining unit to control said aperture unit and transmits the aperture control data to said lens apparatus, synchronized with one of the vertical synchronizing signals, and
wherein said lens apparatus comprises:
(a) a lens;
(b) said aperture unit having a mechanical shutter mechanism, that controls the intensity of light that passes through said lens with an aperture; and
(c) an aperture control unit which controls said aperture unit on the basis of brightness information entered from said brightness information output unit,
wherein said aperture control unit, when the aperture control data is entered from said control unit, causes said aperture unit having the mechanical shutter mechanism to start intercepting the light incident on said lens, and wherein said aperture control unit, having received the aperture control data transmitted synchronized with a first signal of the vertical synchronizing signals and having awaited entering of a second signal of the vertical synchronizing signals, causes, in response to elapse of a time which corresponds to the aperture control data synchronized with the first signal of the vertical synchronizing signals and which is counted from the entering of the second signal of the vertical synchronizing signals, said aperture unit having the mechanical shutter mechanism to start intercepting the light incident on said lens to photograph the still image, and wherein the second signal is output from the image pickup apparatus to the lens apparatus after receiving the first signal.

10. An image pickup system comprising:

an image pickup apparatus; and a lens apparatus to be detachably mounted on said image pickup apparatus, wherein said image pickup apparatus comprises:

(a) an image pickup element which converts an optical image of an object incident via said lens apparatus into electrical signals, synchronized with one of vertical synchronizing signals; and (b) a control unit that (i) generates timing data, according to the controlling of the aperture unit, to cause a light shielding unit having a mechanical shutter mechanism to start intercepting the light incident on said lens apparatus and (ii) transmits the timing data to said lens apparatus, and wherein said lens apparatus comprises:

(a) a lens;

(b) said light shielding unit, which has a mechanical shutter mechanism, that intercepts the light incident on said lens;

(c) said aperture unit for controlling the intensity of light passing through said lens with an aperture; and (d) a light shielding control unit which, when the timing data is entered from said control unit, causes said light shielding unit having said mechanical shutter mechanism to start intercepting the light incident on said lens, wherein said light shielding control unit having received the timing data transmitted synchronized with a first signal of the vertical synchronizing signals from the image pickup apparatus, and having awaited entering of a second signal of the vertical synchronizing signals, causes, in response to elapse of a time which corresponds to the timing data synchronized with the first signal of the vertical synchronizing signals and which is counted from the entering of the second signal of the vertical synchronizing signals, said light shielding unit having said mechanical shutter mechanism to start intercepting the light incident on said lens to photograph the still image, and wherein the second signal is output from the image pickup apparatus to the lens apparatus after receiving the first signal.

11. The image pickup system according to claim 10, wherein:

said image pickup apparatus further comprises a moving image recording unit which records on a recording medium the electrical signals obtained by said image pickup element as data on moving images.

12. A method of controlling the operation of an image pickup apparatus on which a detachable lens apparatus provided with an aperture unit that controls the intensity of light and that passes through a lens with an aperture is to be mounted, the method comprising:

an image pickup step of converting an optical image of an object incident via the lens apparatus on the image pickup apparatus into electrical signals, synchronized with one of vertical synchronizing signals;

a brightness information output step of supplying the lens apparatus with brightness information on the basis of the electrical signals obtained at said image pickup step, synchronized with one of the vertical synchronizing signals;

an aperture value obtaining step of obtaining the aperture value provided by the aperture unit, synchronized with one of the vertical synchronizing signals; and a control step of (i) transmitting data to the lens apparatus for use by the aperture unit to control the intensity of light passing through the lens and, when an instruction to photograph a still image has been entered and while the aperture unit having the mechanical shutter mechanism is controlling the intensity of light passing through the lens, (ii) generating aperture control data that varies according to the aperture value obtained at said aperture value obtaining step to cause the aperture unit having the mechanical shutter mechanism to fully intercept the light incident on the lens and (iii) transmitting the aperture control data to the lens apparatus, synchronized with one of the vertical synchronizing signals, wherein the lens apparatus receives the aperture control data transmitted synchronized with a first signal of the vertical synchronizing signals, wherein said control step includes a step of causing the aperture unit having the mechanical shutter mechanism to start intercepting the light incident on the lens, in response to (1) entering of a second signal of the vertical synchronizing signals and (2) elapse of a time which corresponds to the aperture control data synchronized with the first signal of the vertical synchronizing signals and which is counted from the entering of the second signal of the vertical synchronizing signals, to photograph the still image, and wherein the second signal is output from the image pickup apparatus to the lens apparatus after receiving the first signal.

13. A method of controlling the operation of an image pickup apparatus on which a detachable lens apparatus provided with (i) a light shielding unit, which has a mechanical shutter mechanism, that intercepts the light incident on a lens and (ii) an aperture unit for controlling the intensity of light passing through the lens, the method comprising:

an image pickup step of converting an optical image of an object incident via the lens apparatus on the image pickup apparatus into electrical signals, synchronized with one of vertical synchronizing signals; and a control step of, when an instruction to photograph a still image has been entered and while the aperture unit controls the intensity of light passing through the lens, (i) generating a light blocking timing signal, according to the controlling of the aperture unit, to cause the light shielding unit having the mechanical shutter mechanism to start intercepting the light incident on the lens, (ii) transmitting the light blocking timing signal to the lens apparatus, synchronized with one of the vertical synchronizing signals, wherein the lens apparatus receives the light blocking timing signal transmitted synchronized with a first signal of the vertical synchronizing signals, and (iii) causing the light shielding unit having the mechanical shutter mechanism to start intercepting the light incident on the lens in response to (1) entering of a second signal of the vertical synchronizing signals and (2) elapse of a time which corresponds to the light blocking timing signal synchronized with the first signal of the vertical synchronizing signals and which is counted from the entering of the second signal of the vertical synchronizing signals, to photograph the still image, wherein the second signal is output from the image pickup apparatus to the lens apparatus after receiving the first signal.

14. A non-transitory computer-readable recording medium embodying a computer program to cause a computer to execute control of the operation of an image pickup apparatus on which a lens apparatus can be detachably mounted, wherein the lens apparatus is provided with an aperture unit, which has a mechanical shutter mechanism, that controls the light incident on a lens, the operation comprising:

an image pickup procedure of converting an optical image of an object incident via the lens apparatus on the image pickup apparatus into electrical signals, synchronized with one of vertical synchronizing signals; a brightness information output procedure of supplying the lens apparatus with brightness information on the basis of the electrical signals obtained by said image pickup procedure, synchronized with one of the vertical synchronizing signals; an aperture value obtaining procedure of obtaining the aperture value provided by the aperture means, synchronized with one of the vertical synchronizing signals; and a control procedure (i) of transmitting data to the lens apparatus for use by the aperture unit to control the intensity of light passing through the lens and, when an instruction to photograph a still image has been entered and while the aperture unit having the mechanical shutter mechanism is controlling the intensity of light passing through the lens, (ii) of generating aperture control data that varies according to the aperture value obtained by said aperture value obtaining procedure to cause the aperture unit having the mechanical shutter mechanism to fully intercept the light incident on the lens and (iii) of transmitting the aperture control data to the lens apparatus, synchronized with one of the vertical synchronizing signals, wherein the lens apparatus receives the aperture control data transmitted synchronized with a first signal of the vertical synchronizing signals, wherein said control procedure causes the aperture unit having the mechanical shutter mechanism to start intercepting the light incident on the lens in response to (1) entering of a second signal of the vertical synchronizing signals and (2) elapse of a time which corresponds to the aperture control data synchronized with the first signal of the vertical synchronizing signals and which is counted from entering of the second signal of the vertical synchronizing signals, to photograph the still image, and wherein the second signal is output from the image pickup apparatus to the lens apparatus after receiving the first signal.

15. A non-transitory computer-readable recording medium embodying a computer program to cause a computer to execute control of the operation of an image pickup apparatus on which a lens apparatus can be detachably mounted, wherein the lens apparatus is provided with (i) a light shielding unit, which has a mechanical shutter mechanism, that intercepts the light incident on a lens and (ii) an aperture unit for controlling the intensity of light passing through the lens, the operation comprising:

an image pickup procedure of converting the optical image of an object having come incident via the lens apparatus into electrical signals, synchronized with one of vertical synchronizing signals; and a control procedure of, when an instruction to photograph a still image has been entered and while the aperture unit controls the intensity of light passing through the lens, (i) generating a light blocking timing signal, according to the controlling of the aperture unit, to cause the light shielding means to intercept the light incident on the lens, (ii) transmitting the light blocking timing signal to the lens apparatus, synchronized with one of the vertical synchronizing signals, wherein the lens apparatus receives light blocking timing signal transmitted synchronized with a first signal of the vertical synchronizing signals, and (iii) causing the light shielding unit having the mechanical shutter mechanism to start intercepting the light incident on the lens in response to (1) entering of a second signal of the vertical synchronizing signals and (2) elapse of a time which corresponds to the light blocking timing signal synchronized with the first signal of the vertical synchronizing signals and which is counted from the entering of the second signal of the vertical synchronizing signals, to photograph the still image, wherein the second signal is output from the image pickup apparatus to the lens apparatus after receiving the first signal.

* * * * *